UNITED STATES PATENT OFFICE.

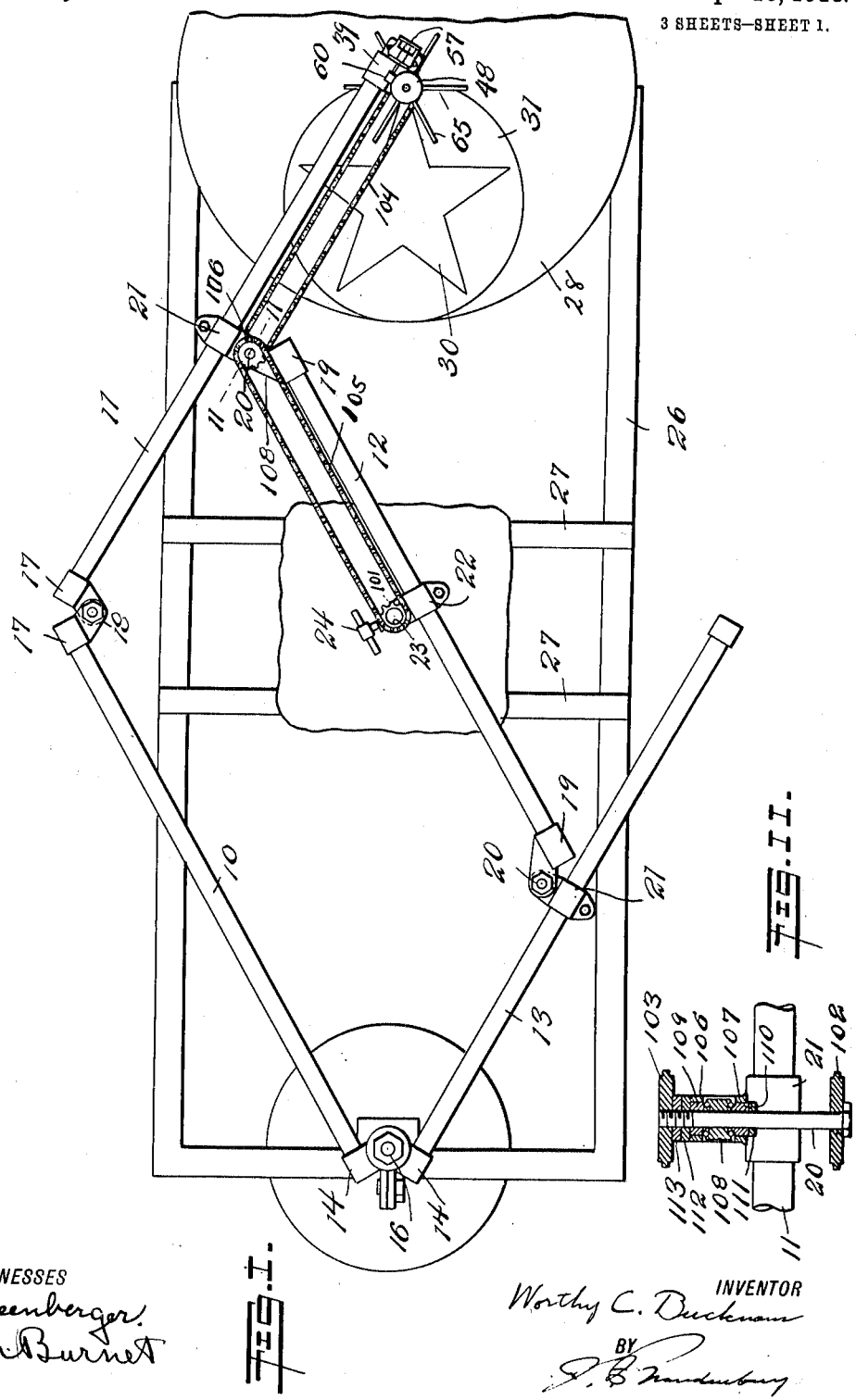

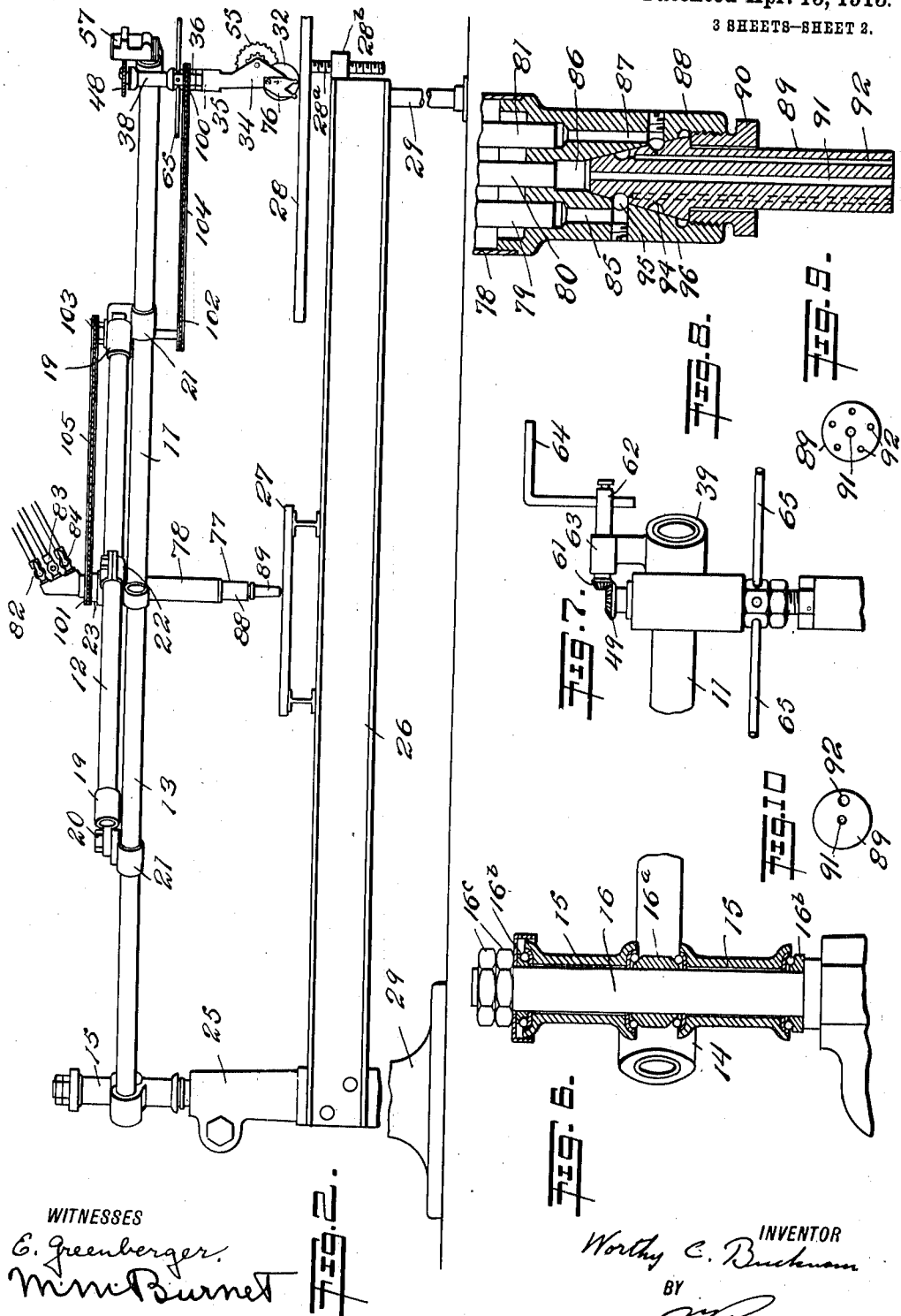

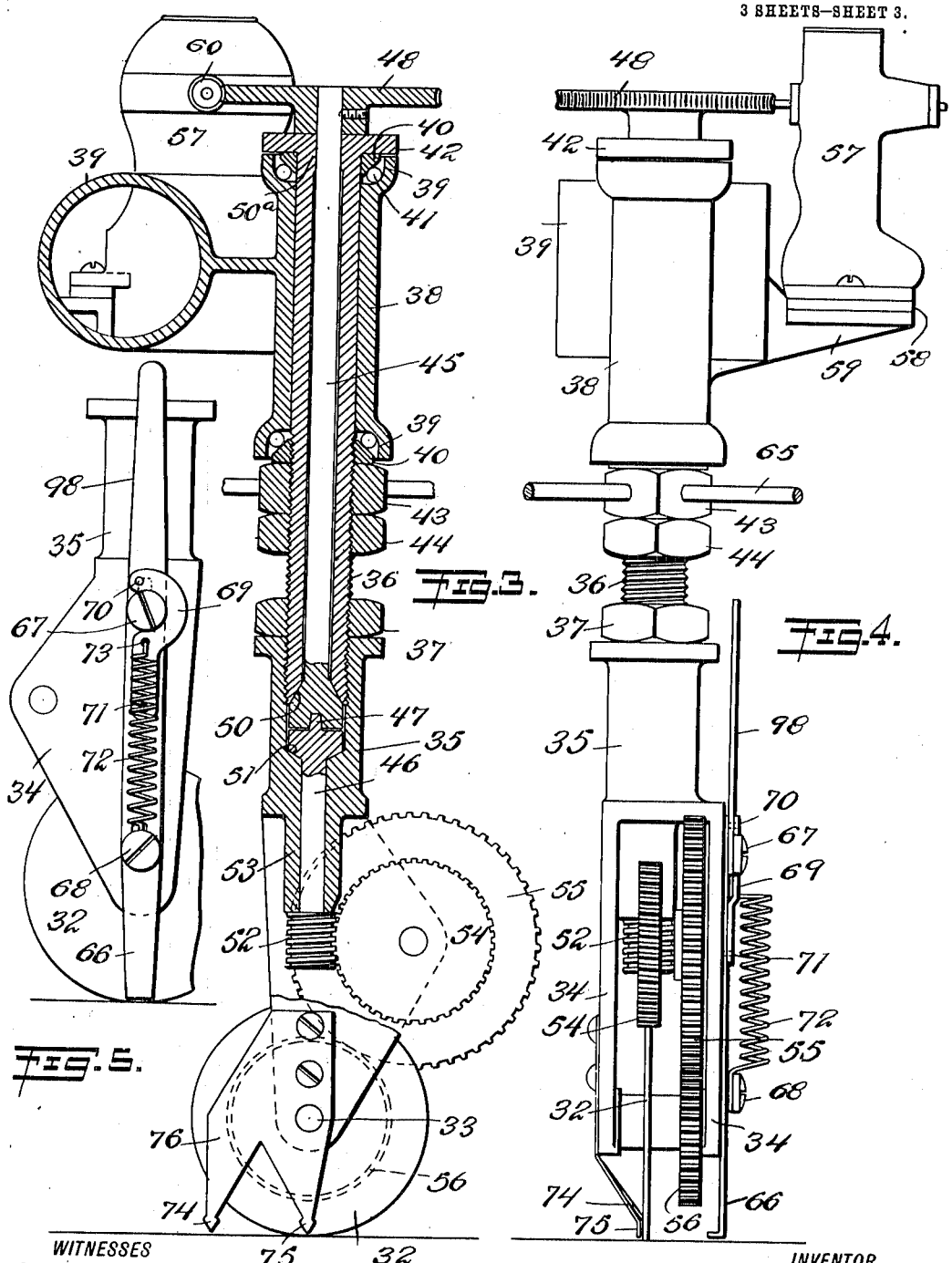

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

PANTOGRAPH APPARATUS.

1,059,271.

Specification of Letters Patent.   Patented Apr. 15, 1913.

Application filed May 4, 1912.   Serial No. 695,290.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Pantograph Apparatus, of which the following is a specification.

This invention relates to pantograph apparatus suitable for various purposes, and the invention resides in applying mechanical propulsion to a pantograph or universally-movable support.

It also comprises numerous specific features of construction and combinations of parts hereinafter described in their preferred embodiments.

In the accompanying drawings illustrating the invention: Figure 1 is a plan view of a suitable form of the apparatus; Fig. 2 is a side elevation thereof, the legs of the supporting structure being broken away; Fig. 3 is a sectional elevation on an enlarged scale of the wheel tracer, its swiveled support, and one form of driving means and connections; Fig. 4 is an elevation at right angles to Fig. 3; Fig. 5 is a side elevation taken at right angles to Fig. 4, showing the wheel tracer and the lifting means for stopping the travel thereof; Fig. 6 is a detail sectional elevation taken at the main or supporting pivot of the apparatus; Fig. 7 is a detail elevation showing another form of drive; Fig. 8 is a detail enlarged section through a form of cutting apparatus; Figs. 9 and 10 are end views of the tip shown in Fig. 8 and of another form of tip; and Fig. 11 is a section on the line 11—11 of Fig. 1.

The pantograph structure may be of that customary form comprising a pivotally jointed parallelogram having one of its members extended to carry the tracer. As shown, it comprises members 10, 11, 12 and 13, the member 11 being extended to carry the tracer and the member 13 being extended for purposes of adjustment, while the member 12 carries the part moved in accordance with the movements of the tracer. The members 10 and 13 are shown pivoted about a fixed axis, by means of collars 14 fixed to their rear ends and secured to or formed with sleeves 15, which are rotatable on an upright post 16. The pivotally jointed members of the pantograph may be formed of tubing as shown. The members 10 and 11 are shown pivoted together by means of collars 17 fixed to their ends and having pivot lugs connected by a pivot 18. The member 12 is shown provided at its ends with similar collars 19, which are connected by pivots 20, 20ª to clamp or split collars 21, 21ª which are adjustable lengthwise on the members 11 and 13. An adjustable holder 22 is provided on the member 12 for the part to be moved in unison with the tracer. It is shown as consisting of a split collar or clamp encircling the member 12 and bearing a vertical tubular socket 23, with which coöperates a set screw 24. As will be understood, the size of the reproduction may be varied by shifting the member 12 with relation to the members 11 and 13 and properly adjusting the holder 22 on the member 12. The pivot post 16 is shown held in a vertical clamping socket 25, which is mounted at one end of any suitable table or work surface support 26. The latter may be merely a frame, upon which may be laid loosely any suitable supports for the work, as indicated at 27. The whole structure may be supported by suitable legs 29. The member 12 may be located above the plane of the members 10, 11 and 13, so as to avoid interference therewith. The sleeves 15 are shown spaced apart by a double cone 16ª having a tight fit on the post 16. Bearing balls are interposed between the sleeves 15 and the cone 16ª and between the sleeves and the bearing members 16ᵇ. Nuts 16ᶜ secure the whole in assembled relation.

A tracer is employed which is adapted to be propelled over a plane surface, which may carry any suitable design, one being illustrated at 30 in Fig. 1. The design may be drawn on a sheet of paper or other material 31 placed on or fixed to the plane support 28. The preferable form of tracer is a thin disk or wheel 32. A suitable support is provided for this wheel, and this support is swiveled with relation to the pantograph structure. In the particular construction illustrated the said wheel is mounted on a shaft 33 connecting the members 34 of a bifurcated holder, the neck 35 of which has the lower end of a bushing or tubular bearing 36 screwed into it. The neck 35 and the bushing 36 may be locked together by a nut 37. The upper, unthreaded portion of the bushing 36 is received rotatably in a vertical tubular bearing 38 carried by or formed integrally with a suitable fixture or sleeve 39 secured to the end of the member 11. The swiveled support, here shown as comprising the parts 34, 35 and 36, may be mounted on ball bearings. As shown the ends of the tubular bearing 38 are formed with race-ways 39, with which coöperate rings 40, balls 41 being interposed between. The upper ring 40 is disposed beneath a head or flange 42 on the bushing 36, and the tightness of the swivel joint may be adjusted and fixed by nuts 43, 44 on the threaded portion of the bushing 36 beneath the lower ring 40.

The pantograph constitutes a guiding structure universally movable in a plane and the tracer constitutes a rolling support therefor capable of traveling in any direction.

In accordance with the invention means are provided for mechanically propelling the tracer wheel 32, and through it the pantograph or universally movable structure. The means may either be manually operated or power driven, though preferably the latter. In either case the mechanical propulsion insures steadiness and uniformity of movement, and being applied to a rolling tracer enables the apparatus to be controlled with the greatest ease and exactitude. The driving mechanism or a part of it is conaxial with the swivel axis of the support for the tracer wheel 32. Thus a vertical driving shaft is extended through the bushing 36 and the neck 35, and between the members 34 of the swiveled support. This shaft is shown as comprising two sections 45 and 46, suitably coupled at their meeting ends as indicated at 47. The upper shaft section 45 has a suitable gear or collar member 48 or 49 (see Fig. 7) secured to its upper end immediately over the top of the head 42 of the bushing; and the lower end of this shaft section is preferably enlarged to afford a cone bearing 50, which contacts with the corresponding internal cone bearing formed in the lower end of the bushing. The bushing or sleeve 36 is preferably of larger internal diameter than the shaft section 45 except at its upper end, where it has a collet bearing 50ª. The upper end of the shaft section 46 may also be enlarged to afford a cone bearing 51 contacting with the corresponding conical surface in the neck 35. The lower end of the shaft section 46 carries a suitable gear 52 immediately below a tubular depending bearing 53. The gear 52 is preferably a worm, which meshes with a worm wheel 54, to which is secured a gear 55 meshing with a gear 56, which latter is rigid with the tracer wheel 32. The conaxial arrangement of the vertical drive shaft enables the tracer wheel to be driven irrespective of the turning of the swiveled support. Thus, part of the driving means, or the source of power or the means of application of manual force, may be mounted on the pantograph structure proper, and more particularly on the member 11.

In the preferred construction an electric motor 57 of suitable design is mounted on a platform 58 carried by a bracket 59 formed with or secured to the collar fixture 39. A worm 60 is mounted on the armature shaft and meshes with a worm gear 48 on the upper end of the shaft section 45. The wires for supplying the motor with current may be suitably arranged without interfering with the movements of the pantograph. It will be obvious that the tracer wheel may be driven by other power means. In the construction shown in Fig. 7 a manual mechanical drive is provided for. In this particular instance a bevel gear 49 is fixed to the upper end of the shaft section 45, and meshes with a bevel pinion 61 carried by a horizontal shaft 62, which is journaled in a bearing 63 on the collar fixture 39 and has a suitable handle crank 64. The remainder of the driving mechanism may be the same as that shown in Figs. 3 and 4.

Means are provided for guiding the tracer in its movements over the design or supporting surface. In the particular construction illustrated a plurality of radiating handles 65 are secured to the nut 43 on the bushing or sleeve 36 of the swiveled support. In this way manual operating means are provided which is always presented for convenient manipulation irrespective of the turning of the swiveled support.

Means are provided for stopping the travel of the power driven tracer, by projecting downward a part which presses against the underlying surface and thereby lifts the tracer. In the preferred form of this device an elongated foot piece 66 is mounted slidably on one of the side members 34 of the swiveled support. This slide is shown as provided with slots which receive the shanks of screws 67 and 68 secured to the member 34. A lever 98 is provided for operating the member 66. It is fulcrumed on the swiveled support as by being pivoted on the screw 67; and it is connected with the foot member 66 by a link 69, pivoted at 70 to the lever 98 and at 71 to the slide 66. A spring 72 urges the slide 66 downward, and is preferably secured at one end to the screw 68 and at the other end to the link 69, at the point 73. The link 69 contacts with a stop when carried past center by the movement of the lever 98 to retract or raise the foot member 66, and the pull of the spring holds the link against this stop so as to maintain the lifting member 66 in inoperative position. Preferably the link 69 contacts with the screw 67 acting as such stop, and to this end the link 69 is of curved or bent formation, so that, normally, as shown in Fig. 5, the effort of the spring is transmitted to the fixed stop 67, so that the spring is powerless to project the foot member 66 downward until the lever 98 is moved sufficiently to the right to carry the pivot 70 past the line of centers. Thus, a very slight movement of the operating or controlling lever 98 is sufficient to enable the spring 72 to project the foot member 66 downward thereby raising the swiveled support, and with it the tracer wheel 32, thus immediately stopping the travel of the tracer and the movement of the pantograph. It will be understood that there is sufficient flexibility in the pantograph structure to permit the slight raising of the swiveled support sufficient to cause the wheel 32 to clear the underlying surface.

A pointer 74 is provided in advance of and in direct alinement with the periphery of the tracer wheel 32, this pointer being spaced but slightly above the underlying surface. Another pointer is provided immediately adjacent the side of the wheel and at its lowest point, this pointer being also slightly spaced above the surface traveled over. Both these pointers may be formed on a plate 76 secured to one of the side members 34 of the swiveled support.

The apparatus or device carried or propelled by the pantograph may be of any desired nature. For illustration a form of gas cutting apparatus is shown, and the mechanically propelled pantograph or universally-movable support is especially desirable in this connection. The cutting means has heating and cutting jet provisions, that is to say, nozzles or conduits and orifices for delivering a stream or streams of oxygen accompanied by a stream or streams of a heating mixture composed of oxygen and a combustible gas, these heating and cutting streams or jets being arranged in suitable relation so as to act locally upon the metal to be cut. As is well-known, the heating flame or flames raise the metal to and maintain it at a temperature sufficiently elevated so that the oxygen stream or jet can oxidize or burn it with great rapidity. It is important that the gas cutting apparatus be moved with practically absolute uniformity, so that the cutting oxygen jet may not be moved outside of the small highly heated zone, in which event the cutting operation would be brought to a stop.

I believe that I am the first to provide means for effecting uniform relative guided movement between the jets of a gas cutting apparatus and the work over irregular courses, so that any desired or odd figure can be accurately and expeditiously cut.

A suitable form of cutting apparatus or torch is illustrated, but it will be understood that this showing is primarily for the purpose of illustration. The apparatus or torch, designated as a whole by the numeral 77, has a tubular casing 78, which is received and clamped in the tubular socket 23. Through this casing pass three pipes or conduits 79, 80 and 81, which at their rear ends have valved connections 82, 83 and 84, for the attachment of flexible tubes leading from suitable sources of supply. At their forward or lower ends the conduits communicate with passages or spaces 85, 86 and 87 in a suitable head 88. In this head is a removable tip 89, which may be replaced by others of different sizes, it being held in place by a screw-threaded bushing 90. The tip is shown as provided with a central bore or passage 91, which communicates at its rear or upper end with the conduit 80, and with other bores or passages 92, which have inlets 93, 94 communicating, respectively, with the passages 85 and 87 in the head 88. It is desirable to provide the rear or upper part of the tip 89 with annular grooves 95 and 96, for establishing communication between the inlets 93 and 94 and the passages 85 and 87. The bore 91 delivers a jet of oxygen for cutting, the pipe 80 being connected with a suitable source of oxygen supply; and the bores 92 deliver heating jets, the pipes 79 and 81 being connected, respectively, with suitable sources of oxygen and combustible gas supply. The combustible gas may be acetylene.

The foregoing special construction of the gas cutting apparatus forms the subject-matter of previously filed applications or patents and is not claimed or essential herein.

Any suitable number of the heating jet bores or orifices 92 may be disposed at different sides of the central cutting jet passage 91. Five of these heating jet orifices are shown. In this way it is insured that the cutting jet will always be preceded more or less exactly by a heating jet, to preheat the metal.

In operation the tracer 32 is propelled over the plane designed, either manually or by power. The torch 77 is moved accordingly. The direction of movement of the tracer may be instantly changed by means of the handles 65. The travel of the tracer and the movement of the pantograph may be instantly stopped by tripping the lever 98, so as to permit the spring 72 to lift the tracer wheel off the underlying surface. The pointer 74 enables the tracer wheel to be guided in a straight line with great precision, and the pointer 75 indicates when the wheel has reached a turning point in the design. The cutting and heating jets directed by the torch 77 against the work are caused to travel in accordance with the design followed by the tracer, and with a uniformity insuring perfect cutting. Vertical adjustment for different thicknesses of work may be secured by shifting the torch 77 vertically in the holder 23, and also by raising and lowering the post 16 in the socket 25. To correspond with the latter adjustment the design support or table 28 is also raised and lowered. To this end it may be mounted on a vertical screw 28ª having threaded engagement with a nut bracket 28ᵇ carried by the main support 26. Thus, the table may be raised and lowered by rotating it.

Means may be provided for causing the cutting apparatus or torch 77 to turn in unison with the tracer. Such means may be widely varied, but in the preferred construction illustrated in Figs. 1, 2 and 11, it comprises sprocket wheels 100 and 101 conaxial with the swivel axis of the tracer and the longitudinal axis of the torch, intermediate sprocket wheels 102 and 103 fixed on the shaft 20 constituting the pivot between the members 11 and 12 of the pantograph, and sprocket chains 104 and 105. The sprocket wheel 100 may be clamped between the two nuts 43 and 44 on the threaded part of the bushing 36. These sprocket wheels and chains are not shown in the views other than those just enumerated, because the feature, while desirable, is not essential. As shown more particularly in Fig. 11, the sleeve attachment 21 on the pantograph member 11 may have spaced upper and lower pivot lugs 106, 107, between which is received the pivot lug 108 of the attachment 19. Cones 109, 110 may be inserted with a tight fit in the lugs 106, 107, and bearing balls may be inserted between these cones and race-ways formed in the lug 108. The pivot shaft 20 is shown as provided with a collar 111 below the cone 110, and a nut and lock-nut 112 and 113 are screwed onto the upper end of the shaft above the cone 109. When the cutting apparatus is caused to turn in unison with the tracer it is unnecessary to surround the cutting jet orifice with heating jet orifices. As shown in Fig. 10 it is sufficient to have one heating jet orifice 92, and as is well understood this single heating jet at all times precedes the cutting jet.

While the preferred form of the apparatus has been described with particularity, it will be understood that the construction shown may be varied widely without departing from the invention.

The present case is directed to the mechanically-propelled pantograph or universal support suitable for any purpose to which it may be put. In the divisional application filed September 18, 1912, Serial No. 720,935, I have claimed this structure in connection with the jet-delivering means, constituting a gas cutting apparatus. In the present case it will be understood that the torch is merely illustrative of any suitable device or appliance that may be moved about by means of the pantograph.

What is claimed as new is:

1. The combination of a pantograph and mechanical means for operating it at uniform speed.

2. A pantograph having a rolling tracer capable of traveling in any direction on an underlying surface.

3. A pantograph and means for mechanically propelling the same comprising a rolling member capable of traveling in any direction and means for rotating said member.

4. A pantograph having a tracing wheel and means for mechanically driving the same.

5. The combination with a pantograph having a tracing wheel of power means for driving said tracing wheel.

6. The combination of a pantograph having a tracing wheel and a motor mounted on the pantograph and connected with said wheel.

7. The combination of a pantograph comprising a system of pivotally connected members, a depending support swiveled thereon, a tracing and supporting wheel journaled in said swiveled support, a motor mounted on the pantograph, and a driving connection between said motor and wheel conaxial with the swivel axis.

8. The combination of a pantograph comprising a system of pivotally connected members carrying a vertical bearing, a support having a bushing rotatable in said bearing, a vertical driving shaft rotatable in said bushing, and a tracing wheel journaled in said support and connected with said driving shaft.

9. The combination of a pantograph comprising a system of pivotally connected members, a support swiveled with relation thereto, a tracing wheel journaled in said support, a driving shaft conaxial with the swivel axis, and gearing connecting said shaft and said wheel.

10. The combination with a pantograph, of tracing wheel, mechanical means for driving the same, and manual means for guiding it.

11. The combination of a pantograph comprising a system of pivotally connected members, a support swiveled with relation thereto, a tracing wheel journaled in said support, means for rotating the wheel and means for turning said support.

12. The combination of a pantograph comprising a system of pivotally connected members, a support swiveled with relation thereto, a tracing wheel journaled in said support, means for rotating the wheel and a plurality of handles extending in different directions from said support.

13. The combination of a pantograph comprising a system of pivotally connected members, a support swiveled thereon, a tracing wheel journaled in said support, a vertical driving shaft conaxial with the swivel axis, a motor carried by the pantograph and connected to the upper end of said shaft, and connections between the lower end of the shaft and said tracing wheel.

14. The combination of a pantograph, a tracing wheel having swiveled connection therewith, and a pointer in advance of and in line with said wheel.

15. The combination of a pantograph, a tracing wheel having swiveled connection therewith, and a pointer beside the wheel adjacent the lowermost point thereof.

16. The combination of a pantograph, a tracing wheel, power means for driving the same, and a member adapted to be projected downward against the surface beneath to raise said wheel.

17. The combination with a pantograph, a support carried thereby, and a tracing wheel journaled in said support, of a lifting member mounted on said support and adapted to be projected downward to raise the support and wheel, a lever and a pivot fulcruming the same on the support, a spring urging said member in one direction, and a link connecting said lever and member, said link being bent to take over said pivot as a stop.

18. The combination with a pantograph, a swiveled support carried thereby, and a tracing wheel journaled in said support, of a lifting member mounted on said support and adapted to be projected downward to raise the support and wheel, a lever fulcrumed on the support for operating said member, a link connecting said lever and member, a spring urging said member in one direction, and a stop positioned to arrest the lever and link when said parts are carried past center.

19. The combination of a stationary support, a structure pivotally connected therewith and comprising pivotally connected arms, a rolling support for said structure movable in any direction, and driving mechanism connected with said rolling support.

20. The combination with a pantograph structure of a rolling tracer, a support therefor swiveled on said pantograph structure, and mechanism for driving said tracer mounted in part on said pantograph structure.

21. A pantograph apparatus having a swiveled tracer, a cutting apparatus, and means for causing the cutting apparatus to turn in unison with the swiveled tracer.

In witness whereof I have signed my name in the presence of two subscribing witnesses.

WORTHY C. BUCKNAM.

Witnesses:
J. F. BRANDENBURG,
E. GREENBERGER.